United States Patent [19]

Häfner

[11] Patent Number: 4,541,285
[45] Date of Patent: Sep. 17, 1985

[54] METHOD AND APPARATUS FOR MEASURING THE PRESSURE OF A LIQUID

[75] Inventor: Hans W. Häfner, Aichach, Fed. Rep. of Germany

[73] Assignee: Pfister GmbH, Fed. Rep. of Germany

[21] Appl. No.: 573,028

[22] Filed: Jan. 23, 1984

[30] Foreign Application Priority Data

Jan. 24, 1983 [DE] Fed. Rep. of Germany ....... 3302175

[51] Int. Cl.⁴ ............................................. G01F 23/18
[52] U.S. Cl. ........................................ 73/744; 73/301; 73/302; 73/745
[58] Field of Search ................. 73/299, 301, 744, 745, 73/302

[56] References Cited

U.S. PATENT DOCUMENTS 4,259,975 4/1981 Kinsey, Jr. et al. .................. 73/301
4,332,166 6/1982 Lawford ............................... 73/299
4,377,809 3/1983 Lawford ............................... 73/301
4,491,016 1/1985 Haefner ................................ 73/302

Primary Examiner—Donald O. Woodiel
Attorney, Agent, or Firm—Hill, Van Santen, Steadman & Simpson

[57] ABSTRACT

In a method and apparatus for measuring the pressure of a liquid in a closed storage tank, a measuring piston is guided in a cylinder and is acted upon on one side by a pressure dependent on the pressure to be measured, the piston being in communication with a load measuring device. In order to compensate for the pressure exerted by gas and/or vapor in the interior space of the tank, that side of the piston opposite to said one side is acted upon by this pressure. This is achieved by enclosing the cylinder and the piston in a container filled with a blocking gas, such as nitrogen. The pressure of the blocking gas in the container is controlled by a regulator operation of which is controlled by sensing means for sensing the gas and/or vapor pressure in the interior of the tank.

11 Claims, 3 Drawing Figures

METHOD AND APPARATUS FOR MEASURING THE PRESSURE OF A LIQUID

BACKGROUND OF THE INVENTION

The invention relates to a method and apparatus for measuring the pressure, in particular the static or quasi-static pressure, of a liquid. The invention has particular application to a measuring apparatus, and to a method using such apparatus, of the kind including a measuring piston which is guided in a cylinder and is acted upon by a pressure dependent on the pressure to be measured and which is in communication with a load measuring device, wherein the piston is guided in the cylinder in a substantially frictionless manner by virtue of lubrication provided by a separating fluid supplied under pressure. Such a measuring apparatus, hereinafter referred to as a measuring apparatus of the kind specified, is disclosed in U.K. patent application No. 8231524, Publication No. 2111212A. A measuring apparatus of the kind specified, and a method using such apparatus, may be used, for example, for measuring the mass of contents of a storage tank for pretroleum products.

When measuring the pressure of a liquid, in particular that of a liquid having a low boiling point, such as propane, butane and the like, there is encountered the difficulty that vapor or gas pressure loading the liquid level from above in a closed tank influences the measurement. As vapor pressure is subjected to variations depending upon temperature, the measurement of the pressure exerted by a column of liquid loaded by vapor pressure may produce unreliable results when using a measuring apparatus of the kind specified. Even if the vapor pressure is ascertained with a view to eliminating the effect of the vapor pressure, the method would be complicated and still not very accurate.

SUMMARY OF THE INVENTION

An object of the present invention is to improve an apparatus of the kind specified so as to alleviate the abovementioned difficulty, whereby an accurate and uncomplicated measurement of the mass of a liquid loaded by a varying vapor pressure becomes possible, even in the case of an inflammable or otherwise dangerous liquid. It is a further object of the invention to provide a measuring apparatus of the kind specified and a method using such apparatus which meet certain safety requirements, while at the same time being uncomplicated and producing results of high accuracy.

According to one aspect of the invention, there is provided a method of measuring the pressure of a liquid in a closed tank with a measuring piston which is guided in a cylinder and acted upon on one side by a pressure dependent on the pressure of said liquid and which is in communication with a load measuring device, wherein the piston is guided in the cylinder in a substantially frictionless manner by virtue of lubrication provided by a separating fluid supplied under pressure, and wherein that side of said piston remote from said one side is acted upon by a pressure corresponding to the gas and/or vapor pressure in said tank above the liquid therein.

According to another aspect of the invention, there is provided an apparatus for measuring the pressure of a liquid in a closed tank including a measuring piston which is guided in a cylinder and acted upon by a pressure dependent on the pressure to be measured and which is in communication with a load measuring device, wherein said piston is guided in said cylinder in a substantially frictionless manner by virtue of lubrication provided by a separating fluid supplied under pressure, the apparatus including a pressure-tight container enclosing said piston, said cylinder and said load measuring device, and pressure transmitting means for transmitting to the interior of said container a pressure dependent on the gas and/or vapor pressure in said tank above the liquid therein.

It will be appreciated that by using a method and apparatus in accordance with the present invention the advantage is achieved that the additional pressure acting upon the said one side of the piston due to the gas and/or vapor pressure in the tank and the pressure acting on the opposite side of the piston can be arranged to cancel out each other. Thereby only the weight of the liquid itself will act upon the measuring piston so that spurious results are eliminated in an uncomplicated and successful manner even with varying vapor pressure.

Preferably, in carrying out the invention, a neutral blocking gas, such as air, nitrogen, carbon dioxide or helium is used for transmitting pressure to said opposite side of the piston.

By using a neutral blocking gas, the possibly inflammable or combustible vapors or gases in the tank are kept away from the measuring apparatus, thereby protecting the measuring apparatus.

Also, preferably the vapors or gases producing the additional pressure are in operative communication with the blocking gas without contact through a yielding separating chamber. Thereby it is achieved that the different gas or vapor filled spaces are hermetically separated from each other.

In a preferred embodiment of an apparatus in accordance with the invention, a pressure-tight container encloses the measuring piston, the cylinder and the load measuring device, the interior of said container being filled with a blocking gas. Such apparatus is compact, uncomplicated, can be produced at low cost and is reliable in operation.

In most cases in practice, it is advisable to include a pressure regulating device in transmitting means through which the container for the measuring device is in communication with a source of blocking gas, and sensing means for sensing the gas and/or vapor pressure in the tank above the liquid. A signal line is arranged to transmit to the pressure regulating device a signal which is dependent on said gas and/or vapor pressure, said regulating device being arranged to adjust the pressure on the blocking gas depending on the magnitude of the pressure which prevails in the tank above the liquid.

The advantage thus achieved is that an absolute pressure equilibrium is brought about between completely separated gas or vapor filled spaces, wherein the spatial separation has no effect and the apparatus may be constructed by commercially available means at a low cost. Moreover, a reliably operating long distance transmission is possible without incurring great expense.

Other objects, advantages and features, as well as equivalent structures and methods which are intended to be covered herein will become more apparent with the teaching of the principles of the invention in connection with the disclosure of the preferred embodiments thereof in the specification, claims and drawings in which:

DESCRIPTION

Figure 1:
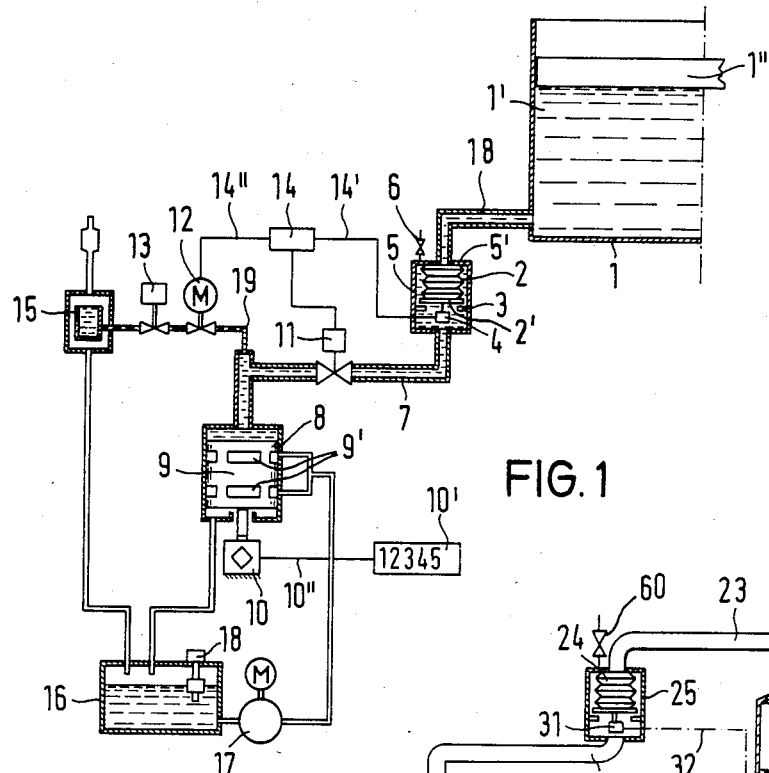
FIG. 1 is a diagrammatic view of a measuring apparatus of the kind specified such as is disclosed in the above-mentioned U.K. patent application No. 8231524.

FIG. 1 shows an open tank 1, partially filled with a liquid 1', the surface of which is covered by a so-called floating roof 1" as is usual with large scale tank storage depots. Open tanks with floating roofs are used mainly for liquids such as crude oil, light oil and the like. The measurement of the mass of liquid in an open tank of this construction, wherein the liquid is loaded by a pressure proportional to atmospheric pressure plus the weight of the floating roof, but not to vapor pressure, represents no difficulties for the measuring apparatus shown in FIG. 1. This measuring apparatus includes essentially a measuring piston 9 guided in a cylinder in a substantially frictionless manner by virtue of lubrication provided by a separating liquid supplied under pressure, the piston 9 being supported on a weighing cell 10 which is connected to an electronic weight display unit 10' by a signal line 10".

Liquid pressure is transmitted from the tank 1 to the top of the measuring piston 9 via pipelines 18, 7 between which a liquid separating chamber 5 is provided for reasons of security. This pressure acts via the pipeline 18 on a metal bellows 2 which is disposed in a separating chamber 5 in such a manner that it is secured by its upper open end to the cover 5' of the separating chamber 5, its interior being in direct communication with the liquid 1' in the tank 1 via the pipeline 8. Thus, the pressure of the liquid 1' stored in the tank 1 acts on the inside of the extensible metal bellows 2 and loads it with a force $K_1$. The separating chamber 5, into which the free extensible end of the metal bellows 2 projects, is connected via the pipeline 7 to the measuring piston 9 and is filled with a separating liquid such as a mineral oil. As a result, the pressure of the liquid 1' stored in the tank 1 is transmitted via the extensible metal bellows 2 and by the pressure of the separating liquid in the supply pipe 7 to the measuring piston 9, without the liquid 1' and the separating liquid coming into contact.

The pressure of the separating liquid in the separating chamber 5 is transmitted directly to the outer surface of the freely extensible end of the metal bellows 2. This produces a force $K_2$ on said outer surface. The metal bellows 2 is in its neutral position when there is an equilibrium of forces, that is to say as soon as $K_1$ is equal to $K_2$. The system of the separating liquid is equipped with a pump 17 which builds up the pressure of the separating liquid in pockets 9' formed in the outer wall of the measuring piston 9 so that a friction-free separation and sealing between the measuring piston 9 and the cylinder 8 is ensured. Taking into consideration the effective area of the measuring piston 9 and the tank 1 as well as calibration characteristics for an error correction, the mass of the stored liquid 1' present in the tank 1 is indicated by the display unit 10', and in particular a difference in mass during storage of liquid in the tank 1 and during extraction of liquid from the tank 1 is indicated with great accuracy.

In order to avoid measuring errors which might result from the spring characteristic of the metal bellows 2, the position of the free end 2' of the extensible metal bellows 2 is maintained at a constant level by means of a displacement sensing means 4, a motorized valve 12 and a regulator 14. The displacement sensing means 4 is constructed in the form of a differential transformer which produces an electrical signal upon deflection of the end 2' of the bellows 2 out of its neutral position. This signal, which is proportional to deflection, is applied, via a signal line 14', to the regulator 14 which converts the control signal into an adjusting pulse which, as a regulating instruction, is transmitted through a control line 14" to the motorized valve 12 and adjusts this. As a result of the adjustment of the motorized valve 12, a return line 19 is opened to a greater or lesser extent as a result of which the pressure of the separating fluid in the supply pipe 17 is adjusted so that the ratio $K_1/K_2$ remains constant, regardless of whether the pressure of the liquid 1' varies.

The delivery pressure of the pump 17 has the effect that the separating liquid moves upwards in the gap between the measuring piston 9 and the cylinder 8. Through a control loop, which comprises the sensing means 4, the motorized valve 12 and the regulator 14, the amount of the separating liquid which escapes through the gap between the measuring piston 9 and the cylinder 8 and which is supplied as the separating liquid to the supply pipe 7, is adjusted by return regulation so that the effect is achieved that the position of the end 2' of the metal bellows 2 remains in its neutral position.

By closing the main valve 11, the zero adjustment of the measuring apparatus can be precisely checked and/or adjusted by means of an overflow vessel 15.

In order to increase the safety of the apparatus, a container 16 for the separating liquid is equipped with a float switch 18. In the event of an inadmissible rise of the separating liquid in the tank 16, the main valve 11 and a non-return valve 13 are closed via the float switch 18.

A vent valve 6 serves to vent the separating chamber 5. The non-return valve 13 is closed when the measuring apparatus is switched off so that the motorized valve 12 can remain in the adjusted position.

Figure 2:
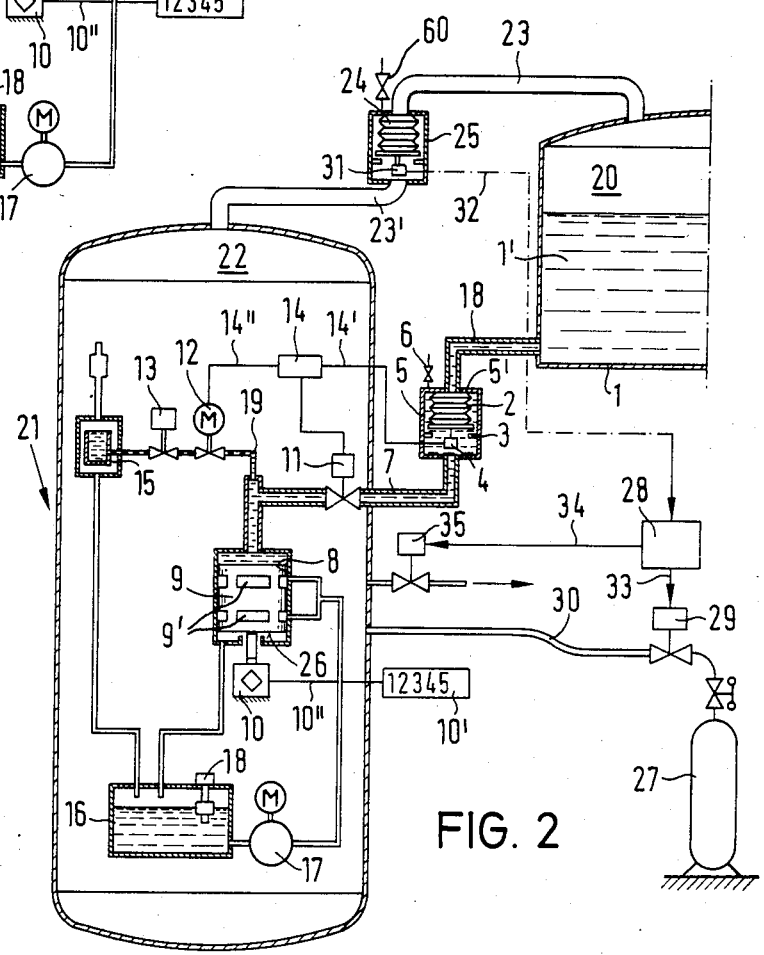
FIG. 2 is a diagrammatic view of a measuring apparatus according to the present invention for use in particular with low boiling point liquids loaded by vapor pressure.

The measuring apparatus improved and further developed according to the invention is illustrated in FIG. 2. Elements in FIG. 2 which correspond to elements in FIG. 1 have the same reference numerals as the corresponding elements in FIG. 1. Referring to FIG. 2, the tank 1 storing the liquid 1' is loaded by a vapor filled space 20. A force is transmitted to the measuring piston 9 via measuring pipelines 18 and 7 having therebetween a separating chamber 5, this force corresponding to the pressure of the liquid column in the tank 1 plus the vapor pressure prevailing in the vapor filled space 20.

The measuring apparatus is arranged inside a pressure-proof container 21, the interior 22 of which communicates with the vapor filled space 20 of the tank 1 through a pressure equalizing pipeline 23, 23'. To provide for the usually occurring situation where the vapor in the space 20 above the liquid 1' is inflammable or combustible, the vapor filled space 20 and the interior 22 of the container 21 must be hermetically separated from each other in order to meet safety requirements. For this purpose, a separating chamber 25 is provided similar to the separating chamber 5, the chamber 25 being equipped with a separating member which is in the form of a freely extensible metal bellows 24. The bellows 24 divides the pressure equalizing pipeline 23, 23' and, acting as a resilient separator, hermetically separates the spaces 20 and 22 from each other.

In order to bring about an adjustable gas pressure in the interior 22 of the container 21 which is identical to the pressure in the vapor filled space 20 and which acts on the lower surface 26 of the piston 9 for pressure equalization, a source of gas is provided in the form of a nitrogen cylinder 27 which transmits an adjustable gas pressure through a pipeline 30 to the interior 22 of the container 21 via a control valve 29 under the control of a regulator 28. To enable this regulation to be effected, the extensible metal bellows 24, acting as a pressure difference gauge, is provided with a sensing means 31 which transmits a signal dependent on the position of the free end of the bellows 24 to the regulator 28 via a signal line 32. The regulator 28 controls the control valve 29 via a control line 33, and controls an outlet valve 35 via a control line 34.

The operation of the measuring apparatus is as follows:

As long as an equilibrium of forces prevails at the extensible metal bellows 24 of the separating chamber 25 due to an identical pressure in spaces 20 and 22, the metal bellows 24 remains in a neutral position. The sensing means 31 cooperating with the metal bellows 24 will also remain in a neutral position in which no signal will be produced. As soon as the equilibrium is disturbed and a pressure difference arises between the gas or vapor filled spaces 20 and 22, the free end of the metal bellows 24 moves in the direction of the lower pressure and causes through the sensing means 31 the production of an electrical signal which is dependent on the position of the free end of the bellows 24. This signal is transmitted via the signal line 32 to the regulator 28 which raises or lowers the gas pressure in the interior 22 of the container in response to the magnitude of the signal, until the pressure difference between the spaces 20 and 22 is again zero, whereupon the metal bellows 24 resumes its neutral position.

With this simple regulating arrangement it is possible to obtain a pressure equalization in the gas or vapor filled spaces 20 and 22 with an accuracy of, for example, $10^{-6}$ bar. By virtue of the hermetic separation of the vapor filled space 20 from the interior 22 of the container 21, the legal safety requirements are fully complied with. Thus, there is a neutral gas, such as nitrogen, in the interior 22 of the container 21, and the liquid tank 1 including its vapor filled space 20 is hermetically separated from this container, so that the measuring apparatus is optimally protected. Even in the event of damage to the resilient metal bellows 24, the pressure equalization provided by the gas regulator 28 prevents the flow of vapor from the vapor filled space 20 into the interior 22 of the container 21.

Figure 3:
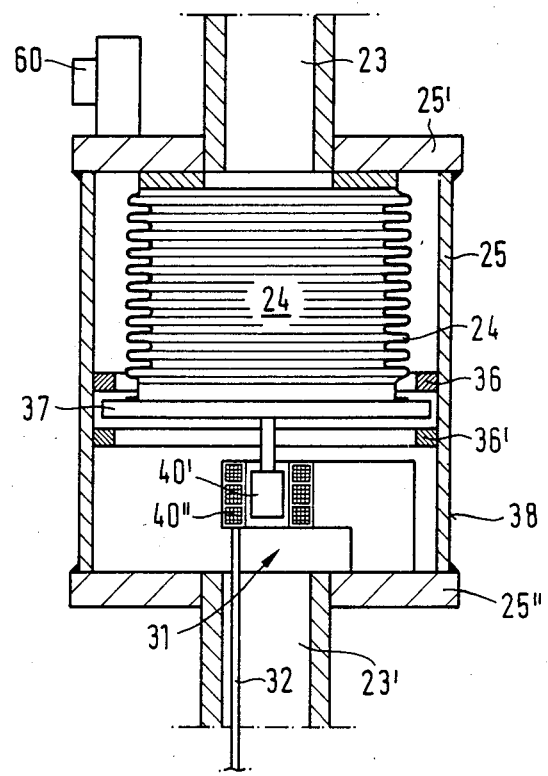
FIG. 3 is an enlarged sectional representation of a separating chamber used in the apparatus of FIG. 2, the section being taken along a plane extending through the axis of the chamber.

FIG. 3 is an enlarged sectional representation of the separating chamber 25. The chamber has a cylindrical housing 38 provided with a top cover 25' and with a bottom plate 25". The pipe 23 of the pressure equalizing pipeline is attached to the top cover 25', and the pipe 23' of the pressure equalizing pipeline is attached to the bottom plate 25". The resilient metal bellows 24 is arranged in the interior of the separating chamber 25 and hermetically separates the pipes 23, 23' from one another. The interior of the metal bellows 24 is in communication with the pipe 23, while its free end is hermetically sealed by means of a terminal plate 37. The downward and upward movements of the terminal plate 37 are limited by the safety abutments 36, 36'. The sensing means 31 is in operational connection with the terminal plate 37. The sensing means 31 is in the form of a differential transformer which produces an electrical signal in response to a mechanical deflection of the terminal plate 37 out of the neutral position. The core 40' of the sensing means 31 is secured to the terminal plate 37 and serves as a displacement pick-up. The coil system 40" of the sensing means, which consists of three windings in known manner, is secured to the bottom plate 25". The signal produced by the sensing means 31 which is dependent on the position of the terminal plate 37 is transmitted via the signal line 32 to the regulator 28 in the manner already described. The separating chamber 25 is equipped with a vent valve 60 which is preferably arranged to enable the adjustment, checking and supervision of the operation of the separating chamber.

I claim as my invention:

1. A method of measuring the pressure of a liquid in a closed tank with a measuring piston which is guided in a cylinder and acted upon on one side by a pressure dependent on the pressure of said liquid and which is in communication with a load measuring device, wherein the piston is guided in the cylinder in a substantially frictionless manner by virtue of lubrication provided by a separating fluid supplied under pressure, and wherein that side of said piston remote from said one side is acted upon by a pressure corresponding to the gas and/or vapor pressure in said tank above the liquid therein.

2. A method according to claim 1, wherein, for the purpose of transmitting said pressure to that side of the piston remote from said one side, a blocking gas is used.

3. A method according to claim 2, wherein said blocking gas is selected from the group consisting of air, nitrogen, carbon dioxide and helium.

4. A method according to claim 2, wherein the gases or vapors producing the gas and/or vapor pressure in said tank are in operational communication with the blocking gas without contact.

5. A method according to claim 4, wherein said operational communication takes place via a yielding separating member.

6. A method according to claim 5, characterized in that the pressure of the blocking gas is adjusted such that an equilibrium of forces prevails at said separating member.

7. An apparatus for measuring the pressure of a liquid in a closed tank comprising in combination:
  a measuring piston guided in a cylinder and having one surface acted upon by pressure dependent on the pressure to be measured;
  a load measuring device connected to the piston;
  means providing lubrication by a separating fluid under pressure to said piston whereby the piston is guided in the cylinder in a substantially frictionless manner;
  a pressure-tight container enclosing the piston and cylinder with an opposed surface of the piston exposed to the pressure in the container;
  and a pressure transmitting means for transmitting to the interior of said container a pressure dependent on the gas and/or vapor pressure in a tank above liquid in said tank.

8. An apparatus for measuring the pressure of a liquid in a closed tank constructed in accordance with claim 7:

wherein said pressure transmitting means includes a pressure regulating device providing communication with the container with a source of blocking gas;

pressure sensing means for sensing said gas or vapor pressure;

and a signal line arranged to transmit a signal which is a function of said gas and/or vapor pressure to said pressure regulating device, said regulating device being arranged in response to said signal to adjust the pressure of said blocking gas so as to be equal to said gas and/or vapor pressure.

9. An apparatus for measuring the pressure of a liquid in a closed tank constructed in accordance with claim 7:

wherein means is provided for connecting the interior of said tank above the liquid to the interior of said container via a separating chamber including a separating member in the form of an extensible metal bellows having a free end which separates said interiors;

and an electrical sensing means operatively connected to said bellows and providing a signal dependent on the position of the free end of the bellows with the signal transmitted via said signal line to said pressure regulating device which is arranged to regulate the pressure of said blocking gas such that an equilibrium of pressure prevails on either side of said separating member.

10. An apparatus for measuring the pressure of a liquid in a closed tank comprising in combination:

a measuring piston guided in a cylinder;

means communicating with one end of the cylinder to deliver a pressure commensurate with the pressure of the liquid in the tank to one end of the piston;

a load measuring device connected to the piston;

a pressure-tight container housing said piston and cylinder with the opposite end of the piston exposed to the pressure in said container;

and a pressure transmitting means for transmitting to the interior of said container a pressure which is a function of the pressure in said tank above the liquid therein.

11. An apparatus for measuring the pressure of a liquid in a closed tank constructed in accordance with claim 10:

including means for supplying a blocking gas to the interior of the container at a pressure which is a function of the pressure above the liquid in the tank.

* * * * *